United States Patent [19]

Jonsson et al.

[11] Patent Number: 5,032,334
[45] Date of Patent: Jul. 16, 1991

[54] METHOD AND APPARATUS FOR SUPPLYING A BINDER TO MINERAL WOOL

[75] Inventors: Stig Jonsson; Bill Ankersson, both of Skövde, Sweden

[73] Assignee: Rockwool Aktiebolaget, Skovde, Sweden

[21] Appl. No.: 450,859

[22] Filed: Dec. 14, 1989

[30] Foreign Application Priority Data

Dec. 16, 1988 [SE] Sweden ................................ 8804551

[51] Int. Cl.⁵ ........................ B32B 17/04; B32B 31/00
[52] U.S. Cl. ........................................ 264/113; 65/4.4; 65/9; 264/518; 264/112; 264/119; 425/81.1; 425/83.1
[58] Field of Search ............... 264/518, 112, 113, 119; 65/4.4, 9; 425/81.1, 83.1

[56] References Cited

U.S. PATENT DOCUMENTS

| | | | |
|---|---|---|---|
| 2,707,690 | 5/1955 | Pearson | 264/518 |
| 2,746,895 | 5/1956 | Duvall | 264/113 |
| 2,897,874 | 8/1959 | Stalego et al. | 65/4.4 |
| 3,218,139 | 11/1965 | Lincoln et al. | 65/9 |
| 3,337,669 | 8/1967 | Shannon et al. | 65/4.4 |
| 3,988,183 | 10/1976 | Senn | 264/113 |
| 4,582,520 | 4/1986 | Sturm | 65/4.4 |

FOREIGN PATENT DOCUMENTS 561100  7/1958  Canada ............................... 264/113

*Primary Examiner*—Mary Lynn Theisen
*Attorney, Agent, or Firm*—Nilles & Nilles

[57] ABSTRACT

Method and apparatus for supplying binder to newly formed mineral wool fibres by means of several distribution means like nozzles or spreaders (30-33, 36-36, 41-43) while said mineral wool fibres are suspended in an air or gas stream on their way to a collection means (29), which in one or more steps form a final mineral wool path (F-J), whereby the binder or binder mixtures from the different distribution means (30-33, 35-36, 41-43) are supplied to different parts of the fibre suspension and in such amounts—in relation to the fibre flow in that part of the fibre suspension, which is actuated by the respective distribution means—that different layers (e.g. F+J, G+I, H) of the final mineral wool path get different content of binder.

12 Claims, 4 Drawing Sheets

METHOD AND APPARATUS FOR SUPPLYING A BINDER TO MINERAL WOOL

BACKGROUND OF THE INVENTION

Generally mineral wool products are manufactured in that a mineral material is melted in a melting apparatus from which the melted material is continuously supplied to a fribrillation apparatus. In said fibrillation apparatus the melted material is transformed, more or less completely, to mineralic fibres which, by means of an air or gas stream, are brought from the fibrillation apparatus to a receiver in the form of a perforated conveyor on which the fibres lay down in the form of a continuous mat of mineral fibres, whereas the air or gas stream moves through the conveyor and to an exhaust fan and is from there transported e.g. to a purification apparatus.

The raw materials for the mineral wool consist of stone or slag, and cupola furnaces usually are used as melting apparatus for such materials. In this case the fibrillation is often made by means of rapidly rotating steel cylinders, called spinning wheels, which are water-cooled from inside the cylinders, and which are arranged to successively receive the melted material. The melted material is thereby moved to one of said spinning wheels from which it is thrown to the next spinning wheel, etc. This type of arrangement is called the cascade spinning method or the JM-process (JM for Johns-Manville). There are generally 2-4 spinning wheels in the cascade spinning apparatus. Only rarely more than 4 spinning wheels are provided in cascade relationship.

Parallelly arranged fibrillation apparatus can be used in order to obtain a higher capacity. Generally, two identical or mirror symmetrical fibrillation apparatus are thereby used, which apparatus are placed side by side and between which the melted material is distributed.

In the manufacture of glass wool there is used more or less convention glass raw materials which are usually melted in a tank. In the most usual fibrillation method for glass wool the melted material is allowed to flow into hollow centrifuges which are mounted for rotation about vertical shafts. There are holes in the jacket of the centrifuges and the melted glass is by the centrifugal force pressed out through said holes thereby forming thin mineral strings, called primary fibres. The actual fibrillation is thereafter accomplished by means of strong axially directed gas or air jets which flow past the jackets of the centrifuges.

Also in the fibrillation of stone or slag mineral wool air flows are supplied round the spinning wheels. There are several reasons for supplying such air flows, for instance for bringing the fibres away from the actual fibrillation apparatus and to the collection means, whereby, as mentioned above, the fibres deposit on the collection means, whereas the gas or air streams pass through the collection means.

In commercial processes for the manufacture of mineral wool products the fibres, just formed, are more or less well suspended in such an air or gas stream, which brings the fibres from the fibrillation apparatus to the receiver means. If a binder is to be added to the mineral wool fibres, and binder is almost always added, the binder is mostly supplied in a finely dispersed form to said fibre suspension. Other substances may be supplied instead of a binder, or in combination with a binder, for instance a wetting agent or a dust binding substance. Often the binder is supplied very close the fibrillation apparatus. The reason for supplying the binder to the fibre suspension, and not to the mat already formed on the receiving conveyor is that is is difficult to have the binder penetrate into a mineral wool mat since such mats are tight and the fibres have a fine structure as compared with the size of the binder drops.

There are basically two different principles for the function of the receiver means. According to one principle, the originally used principle, a final mat is built up on the conveyor of the receiver means, and said final mat is then moved on where it is hardened, cooled, divided and cross cut etc. Technically this means that the surface weight, for instance defined in $g/m^2$, of the the mineral wool when originally laid down on the perforated conveyor is the same as the intended surface weight of the final product already. In many cases the second principle gives a better result, and according to this principle a relatively thin mat, a so called primary mat, is first collected, and said primary path is then, by a folding process, in one or more steps, operated so as to build up a final mineral wool mat, the surface weight of which corresponds to intended surface weight of the final product. The surface weight of the primary mineral wool mat may, in many cases, be much less than that of the final mineral wool mat, for instance 1/10 thereof or less.

The stream of air or gas which brings the mineral fibres from the fibrillation apparatus to the receiver means is more or less turbulent. Tests have shown that the fibres are not completely mixed in the air or gas flow, in particular because the distance between the fibrillation means the the receiver means is not vary long. This means that fibres which are introduced in the said air or gas stream in a certain position tend to deposit at a special point or within a special area of the receiver conveyor, whereas fibres which are introduced in the air or gas flow in another position mainly deposit within another area of the receiver conveyor. This observation has been utilized as a basis for the present invention.

The binder of a mineral wool product is often used firstly to prepare the mineral wool product for its final field of use. For instance, after a mineral wool plate has been inserted between studs and behind final layers of a wall the binder has practically no function at all. In other cases the binder primarily is often supplied for transport technical and mounting technical reasons and only secondarily to fulfil demands of the product in its mounted condition. Anyhow a completely constant and homogenously distributed binder does not always give an optimum product. In cases when there is no need for the same content of binder all over the mineral wool product the inner portion of the product has the least need for binder.

It has been suggested that a binder which is homogeniously distributed in a mineral wool product manufactured according to normal methods should be be completed by an extra supply of binder which is subsequently added on the surfaces of the ready product. Said additional binder has to be dried or hardened before the product is ready, and therefore this is a two stage method. An advantage in such a method is that the main binder can be supplied in smaller amounts than is otherwise necessary. The gain thereof is, however, consumed by the costs for executing the said two stage method.

SUMMARY OF THE INVENTION

The present invention offers the possibility of manufacturing mineral wool products continuously and in one stage, which products have different contents of binder in different parts of the product.

The invention is based on the observation that there is a certain correspondence between a point at the formation of a fibre suspension, on its to the receiver means, and a large or small surface area of the receiver means. Oppositely a certain part of the receiver means can be related to a certain part of the fibre suspension as present at the beginning of its transport. Likewise a certain part of the receiver surface can be related to a certain part of the final product. According to the invention this observation is utilized in that different parts of the fibre suspension is given different kinds of binder or mixtures of binders, and eventually different dosages, so that different layers of the ready mineral wool path or product contain different types of binder or mixtures of binders and eventually also different amounts of binder.

It is thereby particularly interesting to provide a supply of an increased amount of binder on the top and/or the bottom surface layer of the product.

According to the invention it is also possible to change the surface layers or the inner part of the product by supplying thereon or therein a binder of another type, or in another amount.

In the case where the final mineral wool mat is formed by a one-stage method on the receiver means and is built up by a fibre suspension which initially moves horizontally and is deposited on a horizontal or obliquely upwards extending conveyor, referred to as a long chamber process, the upper part of the fibre suspension adjacent the fibrillation apparatus generally forms the upper part of the final mineral wool mat, that is the upper surface layer of the product. Correspondingly the lower part of the fibre suspension generally deposits on the receiver means as the bottom layer of the final mineral wool mat, that is the other surface layer of product.

In the case where the final mineral wool mat is built up by mineral wool fibres from several fibrillation apparatus following each other, the deposit on the receiver means of the fibres from the first one of the fibrillation apparatus mainly form the the bottom layer of the final mineral wool mat, and the fibres from the last fibrillation apparatus form the upper surface layer.

In the case that the final mineral wool mat is formed of several thin primary mineral wool mats that, are laid together, there is a connection between the edges of the primary mat in the upper layer and the bottom layer of the final product. It is thereby possible to supply a special amount of binder to the fibre suspension which deposits adjacent one edge of the primary mat, instead of—not in addition to—the main binder. The addition of binder thereby is presented in the upper layer or in the bottom layer of the final mineral wool mat depending on which edge of the primary mat is treated.

It has been shown that an improved effect is obtained by compressing the primary mat edge thus treated. This can be made by means of a roller which is compressing the primary path over an area from edge thereof and some distance towards the center of the mat, for instance 10–15 cm.

Correspondingly it is possible to identify the part of the fibre suspension which mainly builds up a specific part of the product and to add more binder to this part of the mat. It is also possible to add another binder or another additive like a colouring substance to a particular mineral wool layer.

BRIEF DESCRIPTION OF THE DRAWINGS

Now the invention is to be described more in detail with reference to the attached FIGS. 1–5. In the drawings

DETAILED DESCRIPTION OF THE PREFERRED EMBODIMENTS

Figure 1:
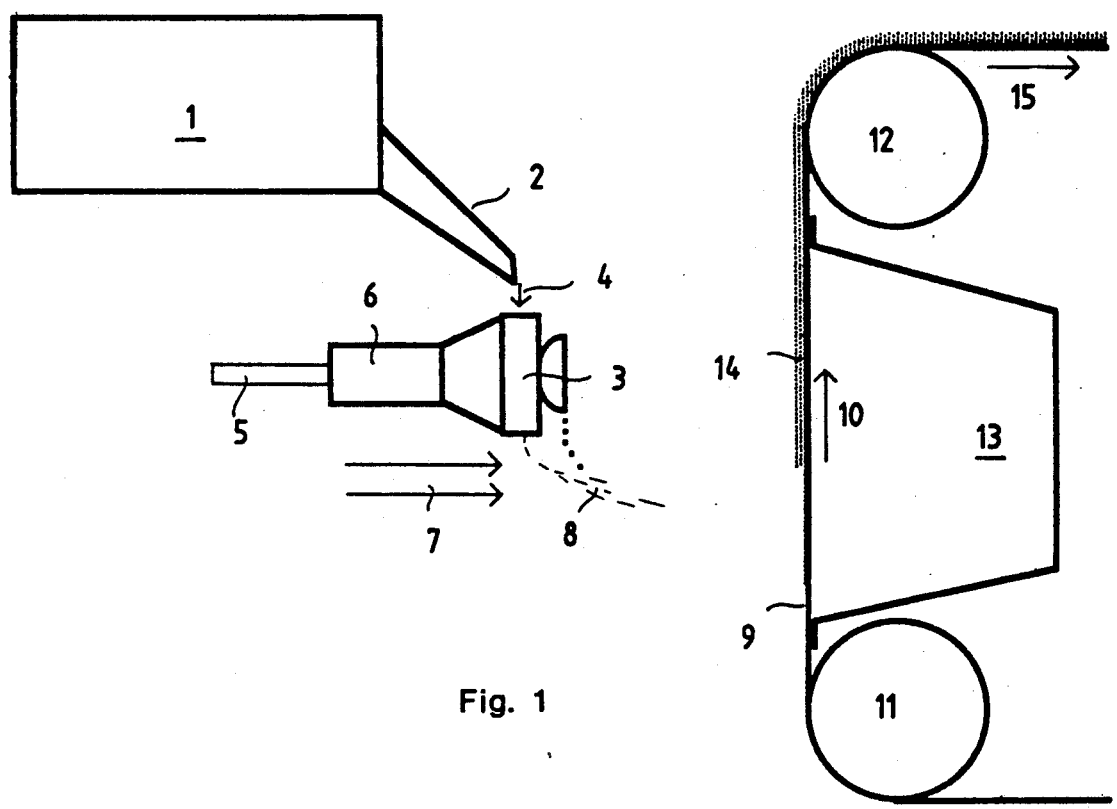
FIG. 1 shows a side view of a first embodiment of an apparatus according to the invention.

FIG. 1 diagrammatically shows the lower part of a melting apparatus 1, from which melted mineral flows out through a flute 2 and down on a spinning wheel 3 in the form of a stream 4. The melting apparatus can be of different types and it is therefore only intimated in the drawing. The spinning wheel 3 is driven by a shaft 5 enclosed in a casing 6. An air stream 7 flows round the spinning wheel 3 parallelly with the shaft 5 of the spinning wheel. The air stream actually flows round the entire spinning wheel, but for the sake of clearness it is marked in the figure only at the lower side of the spinning wheel. When the melted mineral of the stream 4 meets the spinning wheel 3 it wets the spinning wheel but, depending on the centrifugal force, the melted mineral is thrown out therefrom in the form of fibres 8. The fibres are thrown out radially of the spinning wheel 3 but they are deflected by the action of the air stream 7.

The air stream brings the collection means that include a first fibres to the collection conveyor 9, which can for instance be a perforated steel band extending over rollers 11 and 12 in the direction of travel 10. Behind the steel band there is a suction box 13 in which there is a sub pressure provided by a not illustrated fan system. The fibres deposit on the conveyor in the form of a mat 14 which is moved away along a path of travel by the conveyor 9 as indicated with the arrow 15.

Figure 2:
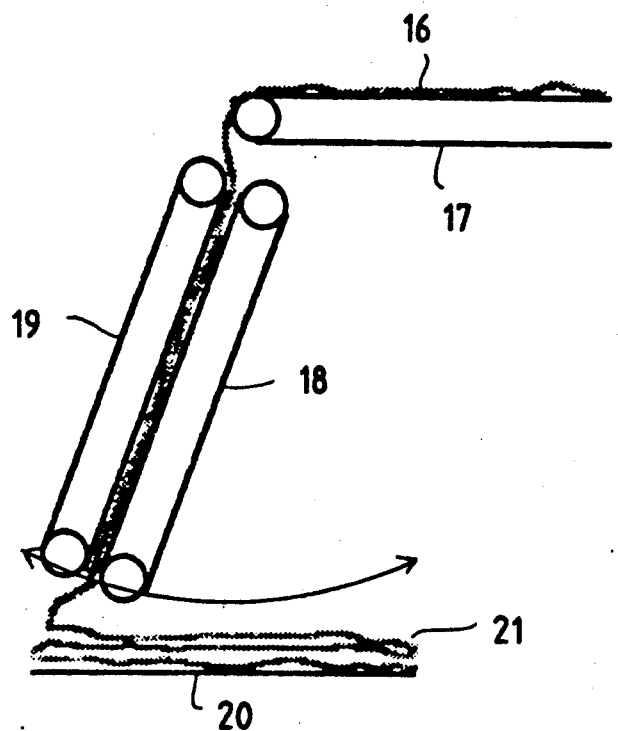
FIG. 2 is a rear view of an apparatus for depositing a mineral wool mat.

FIG. 2 shows the method of forming a thicker mineral wool mat by folding a thin mat in several successive bows or turns. Numeral 16 in the figure shows a thin primary mat for instance like the mat 14 of FIG. 1 having side edge areas. The thin mat 16 is carried on a conveyor 17 to a pendulum folding means, which comprises two conveyors 18 and 19 between which the mat 16 is moved downwards. The conveyors 18 and 19 are, rotatably journalled at their upper ends, whereas the lower ends rhythmically reciprocate over a second receiving transport conveyor 20 which extends perpendicularly to the plane of the drawing and moves with substantially less speed than the conveyors 17, 18 and 19. Thereby the mineral wool mat deposits in bows 21.

Figure 3:
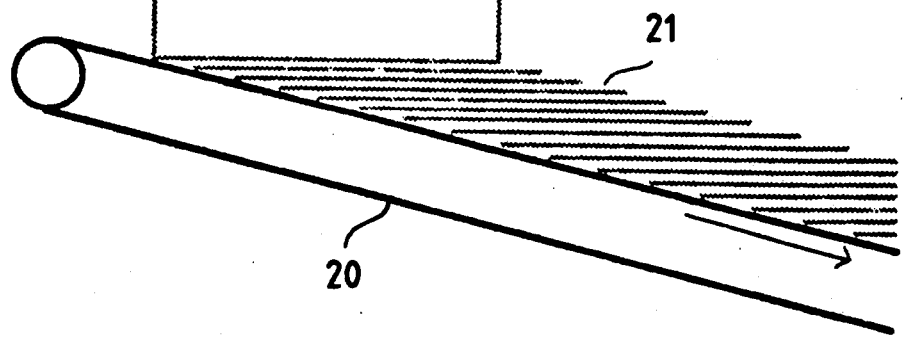
FIG. 3 is a side view of same depositing apparatus.

FIG. 3 is a side view in simplified form of the the same aparatus. The primary mat 16 moves down between the conveyors 18 and 19 (see FIG. 2) as indicated with the arrow 22 whereby the mat is deposited on the transport conveyor 20 in bows 21 which partly overlap and cover each other as indicated in FIG. 3. The surface of one edge area of the primary mat 16 thereby forms one surface layer of the new final mineral wool path, and the surface portion of the other edge of the primary path 16 forms the opposite surface layer of the new final mineral wool mat.

Thanks to the properties of the Primary mineral wool mat 16 the new final mat now formed on the conveyor 20 by the bows 21 is substantially continuous but is thicker than the primary mat 16. The new mat is then moved on to means for compressing the mat and for hardening of the binder, etc.

Figure 4:
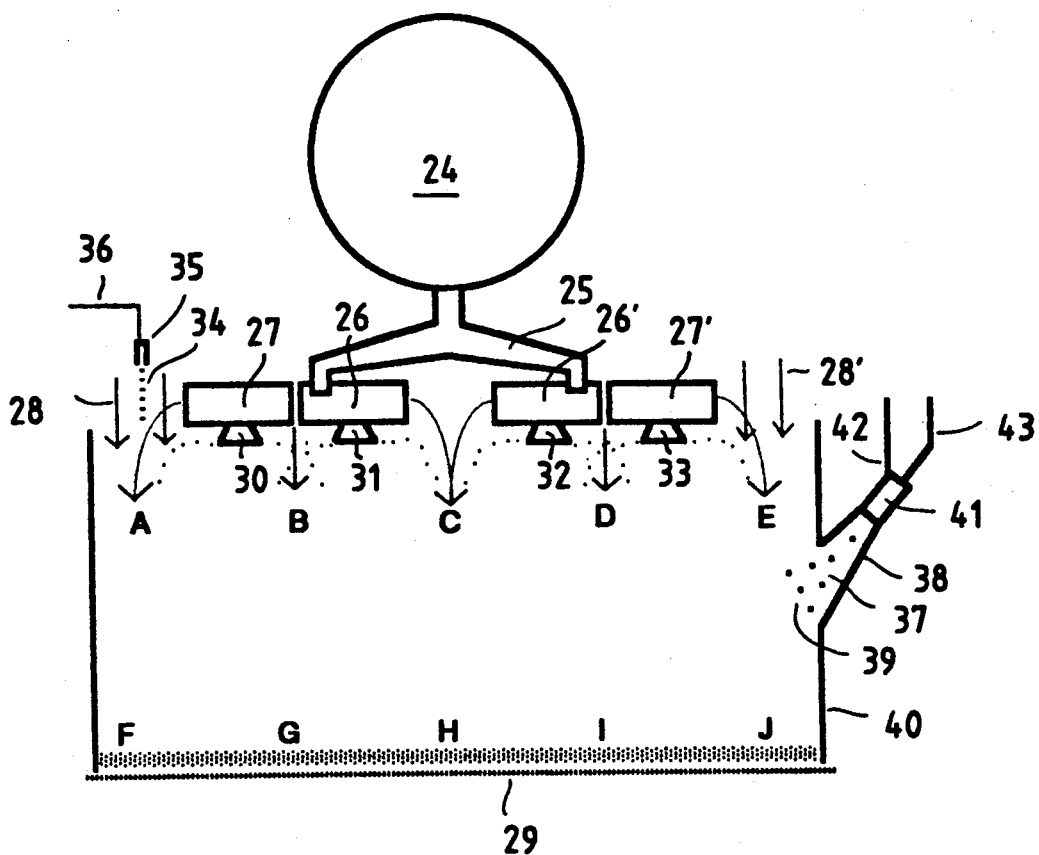
FIG. 4 is a vertical cross section through another embodiment of an apparatus according to the invention.

FIG. 4 diagrammatically shows an apparatus for forming and collecting of a mineral wool mat having two parallel fibrillation stations. Melted mineral flows from a melting apparatus 24 through a twin split flute 25 for melted mineral and is thereby distributed to two primary spinning wheels 26 and 26'. A portion of the melted mineral is transformed to fibres by the spinning wheels 26 and 26', and another portion of the melted mineral is secondarily transferred to the secondary spinning wheels 27 and 27' at the outside of each station and is defibrillated therefrom. The spinning wheels are rotated rapidly by means of drive shafts (not shown in the drawing). The melted mineral is thrown out from the spinning wheels in the form of fibres, and said fibres are, by the action of the air streams 28 and 28' surrounding all spinning wheels, moved towards the collection conveyor as shown by with the arrows A, B, C, D and E. A main amount of binder is supplied from binder distribution means which includes a first distribution means in the form of centre spreaders 30, 31, 32 and 33 and said binder hits the fibre streams A-E. Fibres are thrown out from different points of the periphery of the spinning wheels. Only those fibres which move in the vertical plane (parallelly with the spinning wheel shafts) are shown in the drawing. The binder distribution means also includes a second distribution means 35, 41 supplying additional binder to the mat as will now be described. A stream of additional binder 34 from a second binder supply means which includes nozzle 35 a nozzle 35, which is supplied with binder from a conduit 36, is directed to the fibre stream A. Similarly a stream of additional binder 37 flowing through a second binder supply means which includes channel 38 connected to an opening 39 of the wall 40 is is directed to the fibre flow E. A stream of binder 37 is formed by a nozzle 41 which is supplied with binder from a conduit 42 and with compressed air from a conduit 43.

The fibre streams A-E move towards the collection conveyor 29 by the action of the sub-pressure which is supplied by a suction box (not illustrated) provided at the rear side or bottom side of the conveyor 29. The fibre stream A thereby is deposited mainly at the area F of the conveyor 29, the fibre stream B at area G, etc. It should, however, be noted that there is no strict limits between the fibre streams. Normaly the fibres are transported in a certain turbulent movement, and therefore the fibre streams are mixed with each other so that there are no sharp limits therebetween. So, between the areas F and G a mixture of fibres from the fibre streams A and B deposits, etc.

All binder emitting means, that is the centre spreaders 30, 31, 32 and 33, the nozzle 35 and the nozzle 41 can be supplied with binder separately from each other, and therefore said means can supply different amounts of binder by an individual dosing thereof.

An increased amount of binder can be supplied to a special part of the fibre suspension by means of separate nozzles, like the nozzle 35. A still more concentrated supply of binder can be provided by supplying the additional binder to the fibre suspension closer to the conveyor 29 by means of a nozzle like the nozzle 41.

Since the centre spreaders 30, 31, 32 and 33 distribute their binder evenly round the entire periphery thereof said spreaders preferably supply the base or main amount of binder, which is the least amount to be present in the mineral wool product, and additional binder is supplied, from extra nozzles like the nozzle 35 and the nozzle 41, to those parts of the mineral wool which are to include more binder than said base amount, in particular to the parts forming the surface layers of the mineral wool product.

Figure 5:
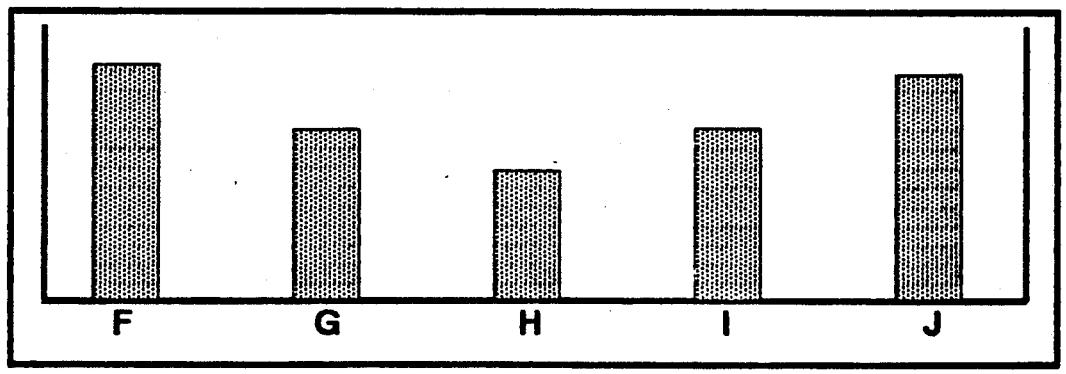
FIG. 5 is a diagram showing the distribution of binder in a mineral wool product.

FIG. 5 shows an example resulting from a process, in which centre spreaders have supplied an amount of binder corresponding to the staple H to the entire fibre suspension, and in which additional binder has been supplied through side nozzles corresponding to the nozzle 35 so that the edges of the primary mat, corresponding to the staples F and J, have received more binder. The remaining part of the mat, that is, intermediate areas corresponding to the staples G and I, has received a medium high amount of binder.

By placing the nozzles for the additional binder at particular places it is possible to obtain a more or less restricted effect. It is not, however, always desired to provide sharp limits between the areas having different contents of binder in a product, and a profile of binder content as shown in FIG. 5 often corresponds to an optimum condition. It is possible to supply, by the nozzle 35 or the nozzle 41, not only additional binder but also binder of another type, solely or in a mixture with the main binder.

It is easy to see that the above described method makes it possible to obtain a nearly unlimited number of variations. It is possible to set up a dosing characteristic fufilling the demands for each specific field of use, in which cases it is considered not sufficient to supply only a main binder for giving the products the desired characteristics.

Of course it may be necessary that a nozzle, corresponding to the nozzle 35, is mounted also on the other side of the apparatus shown in FIG. 4 so that also the fibre stream at E gets additional binder from said other nozzle. Further a nozzle, corresponding to the nozzle 41, may be needed on the other side of the apparatus, the left side as shown in FIG. 4, thereby influencing the fibre stream A at the position F. Correspondingly a number of nozzles, corresponding to the nozzle 35, can be mounted at different positions in relation to the fibrillation apparatus, not only at the sides of the apparatus but also for instance below or above the apparatus.

Figure 6:
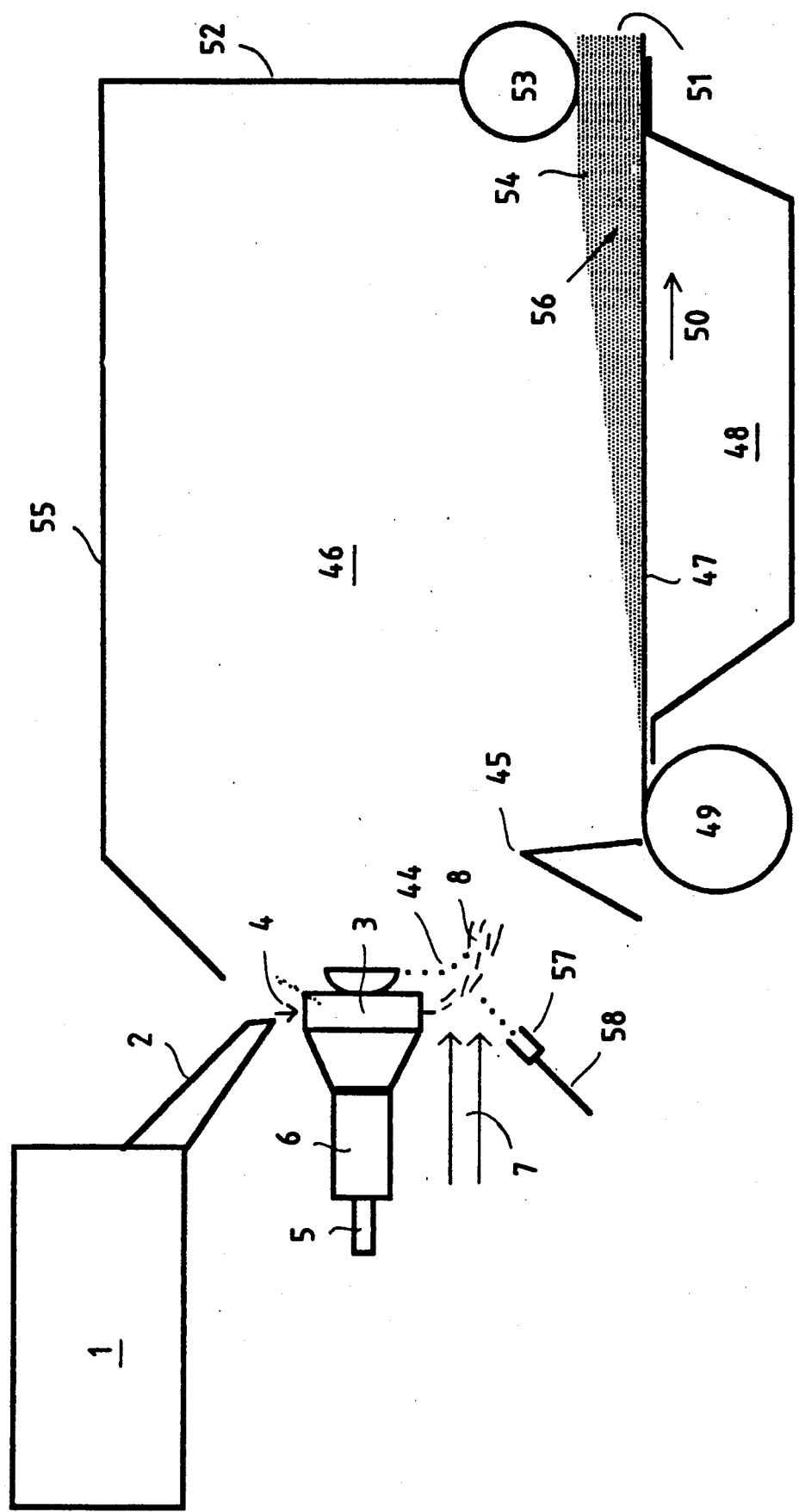
FIG. 6 is another embodiment of an apparatus according to the invention.

FIG. 6 shows an application of the invention in a so called long chamber line. The fibre stream 8 with the binder 44 is brought over the threshold 45 and into the chamber 46 by the air stream. In the chamber the fibre stream 8 descends and the fibres are sucked to the conveyor 47 under which a suction box 48 is mounted. The conveyor 47 extends for instance over the roller 49, which partly extends inside the chamber 46 over the threshold 45. The conveyor moves in the direction of the arrow 50. More and more mineral wool is deposited on the conveyor 47 so that the thickness increases in the direction of the exit 51 of the chamber, where the chamber 46 is sealed by means of a roller 53. It can be shown that the upper part 54 of the leaving mineral wool layer mainly comes from the fibres entering the chamber 46 close to the ceiling 55 thereof and that the fibres at the part of the mineral wool layer 56 located closest to the conveyor 47 originally come from the lower part of the fibrillation apparatus and enter the chamber close to the threshold 45. If it is desired to add more binder to any of the surfaces of the product this is preferably made at the bottom surface, and the additional binder is supplied by means of the nozzle 57 which is supplied with binder over the conduit 58. The stream of binder leaving the nozzle 57 meets the lower part of the fibre plume 8 and ends, as mentioned above, just in the lower part of the product.

In the above description the nozzles 35, 41 and 57 are mentioned as individual nozzles. It is, however, quite possible to use several nozzles rather than one single nozzle, and this is often to be preferred so that the supply of binder does not become too concentrated within one single area. Thus, the nozzle 41 can represent for instance three nozzles mounted vertically above each other.

We claim:

1. A method of supplying binder to newly formed mineral wool fibres comprising the steps of:
    A. establishing a gas stream and moving said gas stream to a collection means;
    B. suspending said newly formed mineral wool fibres in said gas stream to move said fibres to said collection means and forming said fibres into an endless longitudinally extending thin primary mineral wool mat having an upper surface layer, a bottom surface layer, and transversely spaced apart side edge areas separated by a remaining part;
    C. establishing binder distribution means and causing said distribution means to coat said fibres so that one or both of said side edge areas of said primary mat is/are supplied with more binder than that of said remaining part of said primary mat;
    D. moving said primary mat in a direction along a path of travel;
    E. establishing a folding means to receive said primary mat; and
    F. folding said primary mat to create a plurality of successive reciprocating folds each offset in the direction of travel so as to partially overlap a preceding fold to form a final mineral wool mat thicker than said primary mat wherein one of said side edge areas forms an upper layer and the other of said side edge areas forms a bottom layer to provide said final mat with one or both surface layers that have a higher content of binder than that existing in remaining parts of the final mat lying between the upper and bottom layers thereof.

2. The method according to claim 1 comprising the further step of
    G. compressing one or both of said side edge areas of said thin primary mat before said primary mat is folded together to form said thicker final mat.

3. The method according to claim 1 wherein in step C the content of the binder in said upper and bottom surface layers is different from each other.

4. The method according to claim 1 wherein in step C the content of the binder in one or both of said upper and bottom surface layers is different from the content of the binder in the remaining part of the final mat.

5. An apparatus for supplying binder to newly formed mineral wool fibres comprising:
    fibrillation means for transforming melted mineral into mineral fibres;
    means for creating a gas stream which is directed to carry said fibres away from said fibrillation means in the form of a fibre suspension;
    a collection means including a gas pervious collection conveyor having side edges, said fibres depositing on said collection conveyor to form a thin continuous primary mineral wool mat having transversely opposed side edge areas;
    distribution means mounted to apply a binder to different portions of said fibre suspension so as to supply more binder to one or both of said side edge areas of said primary mat;
    a transporting conveyor having a direction of travel; and
    a folding means receiving said primary mineral wool mat and for laying said primary mat in transversely arranged reciprocal overlapping folds that successively advance relative to said direction of travel onto said transporting conveyor to form a thicker folded final mineral wool mat composed of transversely folded layers of said primary mat wherein said side edge areas of the primary mat that have more binder therein form upper and bottom surfaces of the final mineral wool mat.

6. The apparatus according to claim 5 wherein said distribution means for supplying additional binder includes a first distribution means for supplying a main amount of binder and a second distribution means for supplying additional binder, said second distribution means being located in the gas stream which brings the newly formed fibres to said collection conveyor upstream from said fibrillation means.

7. The apparatus according to claim 5 wherein
    said fibrillator means includes at least two parallel sets of fibrillation means and
    said distribution means has a first distribution means for supplying a main amount of binder to said fibre suspension and a second distribution means for supplying additional binder, said second distribution means being placed adjacent and above said side edges of said collection conveyor for supplying additional binder to the fibres forming the side edge areas of the primary mat.

8. The apparatus according to claim 7 wherein
    said distribution means includes a side wall adjacent said collection conveyor having an obliquely downward directed channel downstream of said fibrillation means; and
    said second distributor means for supplying additional binder is placed in said obliquely downward directed channel adjacent one or both of said side edges of said collection conveyor.

9. The apparatus according to claim 6 wherein said second distributor means for supplying additional binder comprises:
    one additional binder supply means arranged upstream of said fibrillation means and in said gas stream which brings the newly formed fibres to said collection means; and
    another additional binder supply means arranged downstream of said fibrillation means.

10. The apparatus according to claim 9 wherein
    said distribution means includes a side wall having an obliquely downward directed channel adjacent at least one of said side edges of said collection conveyor downstream of said fibrillation means; and said another additional binder supply is in said downward directed channel.

11. The apparatus according to claim 5 wherein said fibrillation means comprises two fibrillation stations mounted parallel to each other and perpendicularly to said collection conveyor, each of said fibrillation stations having an outside and a primary and a secondary mineral wool fibre spinning wheel with said primary spinning wheels being in spaced adjacent facing relation to each other; and said distribution means includes an individual first binder supply means in each of said primary and secondary spinning wheels with each of said individual binder supply means being capable of supplying different amounts of binder.

12. The apparatus according to claim 11 wherein said distribution means includes a second distribution means for supplying additional binder, said second distribution means being adjacent said outside of each of said fibrillation stations.

* * * * *